United States Patent
Cravotto et al.

(10) Patent No.: US 12,540,246 B2
(45) Date of Patent: Feb. 3, 2026

(54) METHOD FOR THE PRODUCTION OF METAL OXIDE PIGMENT COMPOSITE OF CONTROLLED AGGLOMERATING PROPERTIES AND RESPECTIVE PRODUCT

(71) Applicant: PRODOTTI GIANNI S.R.L., Milan (IT)

(72) Inventors: Giancarlo Cravotto, Turin (IT); Jicsinszky Laszlo, Budapest (HU); Elena Foglia, Caravaggio (IT)

(73) Assignee: PRODOTTI GIANNI S.R.L., Milan (IT)

( * ) Notice: Subject to any disclaimer, the term of this patent is extended or adjusted under 35 U.S.C. 154(b) by 690 days.

(21) Appl. No.: 17/642,401

(22) PCT Filed: Sep. 23, 2020

(86) PCT No.: PCT/EP2020/076608
§ 371 (c)(1),
(2) Date: Mar. 11, 2022

(87) PCT Pub. No.: WO2021/058591
PCT Pub. Date: Apr. 1, 2021

(65) Prior Publication Data
US 2022/0332952 A1   Oct. 20, 2022

(30) Foreign Application Priority Data
Sep. 27, 2019   (EP) .................... 19425070

(51) Int. Cl.
| C09C 3/00 | (2006.01) |
| A61K 8/29 | (2006.01) |
| C09C 1/24 | (2006.01) |
| C09C 1/36 | (2006.01) |
| C09C 3/04 | (2006.01) |
| C09C 3/10 | (2006.01) |

(52) U.S. Cl.
CPC .............. C09C 3/006 (2013.01); A61K 8/29 (2013.01); C09C 1/24 (2013.01); C09C 1/3623 (2013.01);
(Continued)

(58) Field of Classification Search
CPC ......... C09C 1/043; C09C 1/24; C09C 1/3623; C09C 1/3676; C09C 3/006; C09C 3/041;
(Continued)

(56) References Cited

FOREIGN PATENT DOCUMENTS

| JP | 2004091357 A | * | 3/2004 |
| JP | 2014159520 A | * | 9/2014 |

(Continued)

OTHER PUBLICATIONS

A. L., Kavitha, "Synthesis and Characterization of Iron Oxide-Chitosan Nano Composite", Mechanics, Materials Science & Engineering, pp. 2017.
(Continued)

*Primary Examiner* — Shuangyi Abu Ali
(74) *Attorney, Agent, or Firm* — LUCAS & MERCANTI, LLP

(57) ABSTRACT

A process for preparing a composite containing submicron sized particles of metal oxide pigment and a natural-based organic compound is disclosed. The process includes a step of grinding a metal oxide pigment and a oligomeric and/or polymeric carbohydrate together by means of a ball mill, to obtain a pigment composite containing particles having a submicron granulometry and an outer surface partially or completely covered by the oligomeric and/or polymeric carbohydrate. A pigment composite including pigment particles having a mean hydrodynamic diameter smaller than 1 μm is also disclosed.

16 Claims, 5 Drawing Sheets

(52) U.S. Cl.
CPC ............ *C09C 1/3676* (2013.01); *C09C 3/041* (2013.01); *C09C 3/10* (2013.01); *A61K 2800/43* (2013.01); *A61K 2800/805* (2013.01); *C01P 2004/62* (2013.01); *C01P 2006/60* (2013.01)

(58) Field of Classification Search
CPC .... C09C 3/10; C01P 2004/62; C01P 2006/60; A61K 2800/43; A61K 2800/805; A61K 8/29; G16B 20/20; G16B 20/30; G16B 40/00; G16B 50/30; Y02P 60/87
See application file for complete search history.

(56) References Cited

FOREIGN PATENT DOCUMENTS

| | | | | |
|---|---|---|---|---|
| JP | 2017502097 | A | 1/2017 | |
| JP | 6069189 | B2 * | 2/2017 | ........... A61K 8/0254 |
| WO | 02100955 | A1 | 12/2002 | |
| WO | WO-2012133018 | A1 * | 10/2012 | ........... A61K 8/0254 |
| WO | 2015062978 | A1 | 5/2015 | |

OTHER PUBLICATIONS

Hatice Kaplan CAN, et al., "Preparation, Characterization and Dynamical Mechanical Properties of Dextran-Coater Iron Oxide Nanoparticles (DIONPs)", vol. 46, No. 2, pp. 421-431-, 2018.
Yu Zheng, et al., "Effects of Ball Milling Processes on the Microstructure and Rheological Properties of Microcrystalline Cellulose as a Sustainable Polymer Additive", vol. 11, No. 7, pp. 1-13, 2018.
International Search Report and Written Opinion for Corresponding International Application No. PCT/EP2020/076608 (11 Pages) (Nov. 30, 2020).

* cited by examiner

METHOD FOR THE PRODUCTION OF METAL OXIDE PIGMENT COMPOSITE OF CONTROLLED AGGLOMERATING PROPERTIES AND RESPECTIVE PRODUCT

CROSS-REFERENCE TO RELATED APPLICATIONS

This application is a 371 of PCT/EP2020/076608, filed Sep. 23, 2020, which claims the benefit of European Patent Application No. 19425070.0, filed Sep. 27, 2019.

BACKGROUND ART

In several industrial applications, especially in the field of cosmetics, pigments are generally required to have a size between 0.3 µm and 0.8 µm.

Commercially available pigments have particle sizes which are closer to micrometer rather than to nanometer scale, making it difficult to obtain homogeneous dispersions and thus guarantee a uniform covering of the surfaces to which pigment-colored formulations are applied.

The particle size of commercially available pigments may be between 0.1 µm to even 10 µm.

In order to produce formulations which are homogeneous during their shelf-life and possibly evenly cover different kinds of surfaces, various comminution techniques can be used.

By reducing the particle size to submicron scale, not only the stability of the formulation in which the pigment is dispersed rises, but also the overall quality during application of such formulation is improved. For example, unwanted stripes formation phenomena decrease.

Size reduction with milling is well-known: it is an easily engineered method, applied not only in the production of metals, but also as postproduction treatment of various solids.

Variation of the milling parameters can control the particle size which decreases during milling processes.

However, once dispersed in a specific suspension or formulation, pigment particles are prone to merge during contact to form bigger particles, determining the de-mixing of suspensions and formulations because of sedimentation, creaming, flocculation and/or coalescence phenomena.

Specifically, although the most commonly used metal oxide-based pigments cause the formation of stable compositions in neutral to mild basic environment, the colloidal properties of the derived micro- and nanostructures show considerable instabilities with increasing pH of the dispersion medium. The pH dependent acceleration of aggregation and destabilization of iron oxide nanoparticles are disclosed by Schudel et al., J. Colloid Interface Sci., 1997, 196, 241.

To improve the physicochemical and colloidal properties, wetting and dispersing additives are used.

The use of artificial surfactants as wetting and dispersing additives is known in the art.

While surfactants can interact by various ways, between them usually the non-bonding interactions are dominant. Among these interaction forces, the electrostatic properties are traditionally considered as the most important stabilization factor. In a water-based dispersion, the centered pigment particles are surrounded by an electrochemical double layer of oppositely charged ions or dipoles which are closely attached to the pigment.

The strengths of the attracting and repelling forces are distance dependent and, in a strongly pronounced double layer, the repulsion factor predominates. Therefore, surfactants may be successful in obtaining a stable dispersion containing pigments.

However, when the electrochemical double layer is damaged, e.g. by the addition of electrolyte, attractive forces become preponderant and the dispersion breaks down. For example, this situation can occur during the preparation of cosmetic formulations.

Moreover, a further common problem related to surfactants and other additives is that they can determine significant drawbacks in the characteristic of the formulation to which are added; rheological modifications are likely, for example, the lowering of the viscosity is very common. In addition, the use of surfactants has a major influence on a wide range of essential characteristics of the formulation as color strength, hiding power, flocculation, gloss, flooding and floating, etc.

Therefore, the need to provide a new technology for producing stable formulations comprising pigments, especially in the field of cosmetics and coatings, is particularly felt. Such stable formulations comprising pigments are expected to ensure at least the following performances: i) minimum complexity of the production process, ii) good properties under dispersibility point of view, iii) good stability of the latter and iv) strong coloring hues.

Field of the Invention

The present invention relates to the field of pigments and formulations of cosmetic and coatings comprising them, in particular aqueous-based pigment compositions of submicron granulometry and dispersions thereof.

SUMMARY

The present invention relates to a process for the production of a pigment composite containing pigment particles having submicron size. Specifically, a main object of the present invention is a process for the preparation of a composite containing submicron sized particles of metal oxide pigment and natural-based organic compound, comprising the step of grinding a metal oxide pigment and a oligomeric and/or polymeric carbohydrate together by means of a ball mill, so as to obtain a pigment composite containing particles having a submicron granulometry and an outer surface covered by said oligomeric and/or polymeric carbohydrate.

According to a preferred embodiment, the aforementioned pigment is a transition metal oxide pigment.

According to another aspect, a new pigment composite obtainable by the aforementioned process is also an object of the present invention.

It has been experimentally observed that the aforementioned new pigment composite comprises particles having a hydrodynamic diameter at neutral, slightly basic and mild basic pH lower than the hydrodynamic diameter of pigment particles of the same type which have not previously subjected to the preparation process according to the present invention.

DETAILED DESCRIPTION OF THE INVENTION

Figure 1:
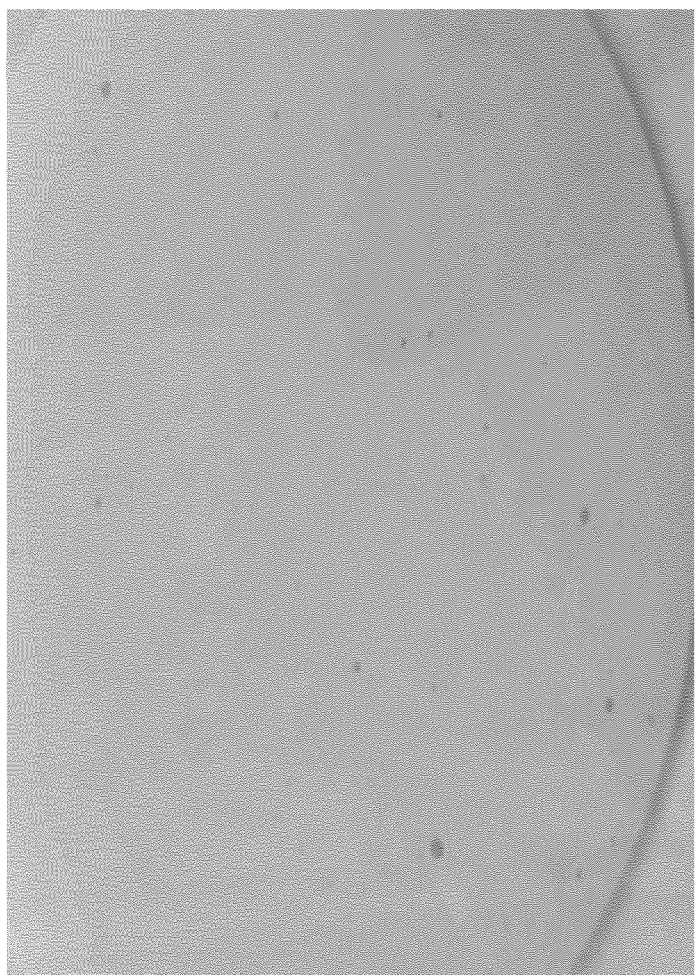
FIG. 1 shows a skin formulation obtained by using a mixture of metal oxide pigment composite according to the present invention.

In accordance with the present invention, with the term "pigment" is intended a coloured or white or black substance which is capable of imparting to a dispersing material or substance its own colour or hue in a permanent way, imposing a specific colour to the reflected or transmitted light as a result of a selective absorption of particular wavelengths; a pigment has normally a high tinting strength with respect to the material or substance to which it is mixed to colour it.

In accordance with the present invention the term "granulometry" means a numerical range comprising the minimum value and the maximum value of the diameter of the particles forming the composite according to the present invention.

According to the present invention, with the expression "submicron size" is intended particles having a medium diameter which is lower than 1 μm.

The term "ball mill" used herein broadly refers to any milling devices comprising a milling chamber (e.g. a jar) into which the material to be milled can be introduced; the milling chamber contains one or more freely moving balls, whose movements cause the comminution of the material to be milled; as a general non-limitative rule, the movement of the balls can be obtained by applying a rotating, revolving and/or vibrating movement(s) to said milling chamber.

One preferred example of ball mill is the "planetary ball mill"; in this apparatus the milling chamber can be set in rotation around its vertical axis; optionally, a complementary revolution movement around a suitable revolution center is further applied to the milling chamber; such movement(s) cause the milling balls inside the milling chamber to freely move and intermix with the material to be milled, causing its comminution. An example of commercially available planetary ball mills is the apparatus Retsch PM 100.

Further examples of ball mill are the roll ball mill and the cylindrical ball mill. In both these cases the milling chamber is set in rotation around its horizontal axis; this movement causes the milling balls inside the milling chamber to freely move and intermix with the material to be milled, causing its comminution. In roll ball mills, the rotatory movement is applied to the milling chamber by contact of its external surface with contra-rotating rotating guides or rolls. An examples of commercially available roll ball mills is the apparatus Tencan GQM-2-5. In cylindrical ball mills, the rotational motion is applied to an element that either extends from the horizontal axis of the milling chamber or is rotationally fixed indirectly by a gear/V-belt. An example of commercially available cylindrical ball mills is the apparatus Tencan QM-30 L.

According to the present invention, with the expression "ball-to-mass ratio" is intended the ratio between the total weight of the balls/beads contained inside the ball mill used during said step b) of grinding and the total mass of the material-to-be-grinded which is fed into the ball mill, i.e. the metal oxide pigment and the natural-based organic compound fed into the ball mill or any other material eventually fed into the ball mill, for example before or during grinding step b).

According to the present invention with the term "shelf-life", it is intended the length of time during which the pigment composite obtained by the present process can be stored at room temperature without becoming unfit for use; namely, when properly dispersed in a medium, in particular in an aqueous medium, a stable formulation in terms of its phase separation and color can be obtained.

The present process for the preparation of a composite containing submicron sized particles of metal oxide pigment and natural-based organic compound, comprises the following steps:

a) providing a metal oxide pigment and an oligomeric and/or polymeric carbohydrate;

b) grinding said metal oxide pigment and said oligomeric and/or polymeric carbohydrate inside a ball mill, so as to obtain a pigment composite comprising metal oxide particles having a submicron granulometry and an outer surface partially or completely covered by said oligomeric and/or polymeric carbohydrate;

wherein the mass ratio between said metal oxide pigment and said oligomeric and/or polymeric carbohydrate provided during said step a) is comprised between 1:10 and 10:1.

Preferably, said step b) of grinding is carried out under dry milling conditions.

According to a preferred embodiment, the mass ratio between said pigment and said oligomeric and/or polymeric carbohydrate may be comprised between 1:5 and 5:1.

Advantageously, as shown in the experimental part, when the mass ratio between said pigment and said oligomeric and/or polymeric carbohydrate is increased, the granulometry of the pigment composite obtained by the process according to the present invention may be reduced.

Preferably, said grinding step b) is carried out with a ball-to-mass ratio generally comprised between 2:1 and 15:1. Ball-to-mass ratios particularly suited for planetary ball mills are more selectively comprised between 3:1 and 10:1; ball-to-mass ratios particularly suited for roll ball mills or cylindrical ball mills are more selectively comprised between 2:1 and 7:1.

Advantageously, as shown in the experimental part, when ball-to-mass ratio is reduced, the granulometry of the pigment composite obtained by the process according to the present invention may be reduced as well.

Alternatively, said grinding step b) is carried out under wet milling conditions.

When the present process is carried out under wet milling conditions, before or during said grinding step b) a wetting material or a glidant can be added to said metal oxide pigment and an oligomeric and/or polymeric carbohydrate.

Preferably, said wetting material is water, ethyl alcohol or a surfactant.

More preferably, said surfactant is selected from the group comprising esters of long chain fatty acids, aryloxyalcohols, polymeric alcohols, alkyl ethers of glycerols, and the like.

Even more preferably, said surfactant is added in a quantity comprised between 0.5% and 2.5% by weight of the total weight of the material fed into said ball mill.

In general terms, said step b) of grinding is preferably carried out at a rotational speed between 200 rpm and 700 rpm, more preferably between 300 rpm and 550 rpm, and for a time between 0.5 hours and 15 hours, more preferably between 1 hour and 9 hours; these conditions are particularly suited for planetary ball mills.

Alternatively, said step b) of grinding is preferably carried out at a rotational speed between 20 rpm and 400 rpm, more preferably between 20 rpm and 200 rpm, and for a time between 0.5 hours and 15 hours, more preferably between 1 hour and 9 hours; these conditions are particularly suited for roll ball mills or cylindrical ball mills.

In all the aforementioned embodiments, preferred, non-limitative examples of materials making up the milling balls are zirconia (i.e. zirconium oxide), stainless steel, etc. Preferred, non-limitative examples of materials making up the milling chamber are zirconia, perfluorinated polymers, stainless steel, etc. Preferred, non-limitative combinations of materials for milling balls and milling chamber are: alumina or zirconia balls in ceramic chamber, zirconia balls in zirconia chamber, zirconia balls in polymeric perfluorinated chamber, and stainless steel balls in stainless streel chamber. In addition to the aforementioned examples, said constitutive materials, as well as the dimensions of the milling chamber and the dimensions/weight/amount of the milling balls, can be chosen according to options customarily applied in the field and possibly further adapted depending on the type and amount of material to be milled.

Advantageously, the present process allows to obtain a pigment composite, which is not subjected to particle re-aggregation during milling procedures and which is stable in terms of its color during its shelf-life.

In particular, as it will be shown in detail with reference to the experimental part, such pigment composite can be easily and stably dispersed in liquid media, in particular in an aqueous medium, obtaining suspensions which have good stability and strong coloring hues.

During the aforementioned grinding step b) the motion of pigment particles is limited and the chemically favorable dispositions of interacting atoms are restricted to the outer surface of the so-forming particles, which have a reduced average size, if compared to the average size of the native metal oxide pigment.

The newly formed surfaces, thanks to the co-grinding oligomeric and/or polymeric carbohydrate material, can be immediately covered with the latter material(s), so as to reduce re-aggregations. In particular, hollow macro-molecular structures of cyclodextrins or of fibrous- or lamellar-type polysaccharides, like ionic and nonionic celluloses and cellulose derivatives, readily incorporate pigment particles.

Such recovered association particle composites have hydrophilic outer surfaces playing an important role in the colloidal stability of the formulation in which they can be dispersed.

More advantageously, during said grinding step b) the formation of oxo-complexes and/or hydrogen bond stabilized associates between the aforementioned metal oxide pigments and said oligomeric and/or polymeric carbohydrate occurs. Such oxo-complexes or hydrogen bond stabilized associates prevent the formation of large particles not only under mechano-chemical conditions, in other words while said step b) of grinding is carried out, but especially when the so-obtained pigment composite is dispersed in an appropriate aqueous medium.

In particular, as it will be shown in detail in the experimental part, the aforementioned pigment composite can be easily dispersed in aqueous medium having from neutral to basic pH.

As an additional improvement, when dispersed in aqueous medium, the so-formed stable formulations have favorable sedimentation properties, which remains even after pH shifts or adjustments.

A further improvement achieved by the process according to the present invention is the increased color stability of particle size dependent color and color shades of the so-obtained pigment composites. The restricted self-aggregation of the submicrometric and nanometric size particles preserves the optical properties of those pigments and their color can stay for a longer time in dispersed and non-dispersed form.

In addition, as it will be disclosed more in detail in the experimental part, a further improvement of the present invention is that the particles of the pigment composite as obtained by the aforementioned process do not stick on surfaces of packaging materials, like glass and plastics, and do not cause unwanted coloration of those materials.

In accordance with the process of the present invention, said neutral-based organic compound, i.e. oligomeric and/or polymeric carbohydrate, can be added to and mixed with the aforementioned metal oxide pigment at any stage of the present process, preferably before or during said step b) of grinding.

Preferably, said metal oxide pigment is a transition metal oxide pigment.

More preferably, said metal oxide pigment can be selected from the group consisting of iron (III) oxide (CAS No: 1309-37-1 (red pigment) or CAS No: 51274-00-1 (yellow pigment)), iron (III) and (II) oxide (CAS No: 1317-61-9, black pigment), titanium oxide (CAS No: 13463-67-7), and chromium (III) oxide (CAS No: 1308-38-9), manganese (IV) oxide (CAS No. 1313-13-9), zinc oxide (CAS No. 1314-13-2), cobalt (II) oxide (CAS No. 1307-96-6), zirconium (IV) oxide (CAS No. 1314-23-4), tungsten (VI) oxide (CAS No. 1314-35-8) and any combination thereof.

Preferably, said oligomeric and/or polymeric carbohydrate is selected from the group consisting of ionic cellulose, nonionic cellulose, derivative of ionic or nonionic cellulose, starch, alginates, hyaluronates, chitosanes, carrageenans, pectins, cyclodextrins and any combination thereof.

In an even preferred manner, said oligomeric and/or polymeric carbohydrate is a cyclodextrins, more preferably a β-cyclodextrin.

In an equal preferred manner, said oligomeric and/or polymeric carbohydrate is ionic cellulose, non-ionic cellulose or a cellulose derivative, more preferably carboxymethylcellulose or salts thereof.

According to a preferred embodiment of the present process, a base additive is added to said metal oxide pigment and said oligomeric and/or polymeric carbohydrate.

In accordance with the process of the present invention, said base additive can be added to and mixed with the aforementioned metal oxide pigment at any stage of the present process, preferably before or during said step b) of grinding.

Said inorganic base additive can be an inorganic or organic base according to Brønsted-Lowry acid base theory.

In an equally preferred manner, said base additive can be an inorganic base additive, preferably said inorganic base additive is selected from the group consisting of alkali hydroxide, alkali-earth hydroxide, carbonates, hydrogencarbonates and any combination thereof.

More preferably, said inorganic base additive is sodium hydroxide, sodium carbonate or sodium hydrogen carbonate.

Preferably, the mass ratio between said pigment and said inorganic base additive is comprised between 1:2 and 10:1.

More preferably, the mass ratio between said pigment and said inorganic base additive is comprised between 1:2 and 5:1.

According to a preferred embodiment of the present invention, said base additive is an organic base additive, preferably said organic base additive is selected from aminoacids, alkyl or arylalkyl amines, hydroxyalkyl or (hydroxy)arylalkyl amines, hydroxyalkyl or (hydroxy)arylalkyl ureas, hydroxyalkyl or (hydroxy)arylalkyl thioureas or any combination thereof.

Said aminoacids can be L-aminoacids, D-aminoacids or their mixtures.

Preferably, said organic base additive is arginine, tris (hydroxymethyl)methylamine or urea.

According to an even preferred embodiment, said base additive is a combination of an inorganic base and an organic base, preferably a combination of any one of the aforementioned inorganic base additives with any one of the aforementioned organic base additives.

Advantageously, when a base additive is added to said metal oxide pigment and to said oligomeric and/or polymeric carbohydrate, the ability of the aforementioned pigment composite to form stable formulation at moderately basic pH and after pH shifts or adjustments can be improved.

More in detail, when said base additive is added, it has been surprisingly found out that some classes of oligomeric and/or polymeric carbohydrates can better adhere to pigment particles under formation during the aforementioned grinding step b).

For example, as show in the following experimental section, when native metal oxide pigments are grinded with cyclodextrins and a base additive, the pigment composite thus obtained can be better dispersed in aqueous-based dispersions, if compared with similar pigment composite, which have been produced without adding any basic additive.

Without being bound by any scientific theories, while native metal oxide pigments are milled with cyclodextrins and a base additive, the base additive deprotonates some of the hydroxyl groups of the cyclodextrin, improving the capability of the latter to form strong intermolecular interactions with the surface of the pigment particle under formation.

According to a preferred embodiment of the present process, during said step a) of providing a metal oxide pigment and an oligomeric and/or polymeric carbohydrate, said oligomeric and/or polymeric carbohydrate provided is a β-cyclodextrin; at the same time, said inorganic base additive added to said metal oxide pigment and said β-cyclodextrin is NaOH.

According to another preferred embodiment of the present process, during said step a) of providing a metal oxide pigment and an oligomeric and/or polymeric carbohydrate, said oligomeric and/or polymeric carbohydrate provided is a β-cyclodextrin; at the same time, said inorganic base additive added to said metal oxide pigment and said β-cyclodextrin is $NaHCO_3$.

According to another preferred embodiment of the present process, during said step a) of providing a metal oxide pigment and an oligomeric and/or polymeric carbohydrate, said oligomeric and/or polymeric carbohydrate provided is a β-cyclodextrin; at the same time, said organic base additive added to said metal oxide pigment and said β-cyclodextrin is arginine.

According to another preferred embodiment of the present process, during said step a) of providing a metal oxide pigment and an oligomeric and/or polymeric carbohydrate, said oligomeric and/or polymeric carbohydrate provided is a β-cyclodextrin; at the same time, said organic base additive added to said metal oxide pigment and said β-cyclodextrin is tris(hydroxymethyl)methylamine.

According to another preferred embodiment of the present process, during said step a) of providing a metal oxide pigment and an oligomeric and/or polymeric carbohydrate, said oligomeric and/or polymeric carbohydrate provided is a β-cyclodextrin; at the same time, said organic base additive added to said metal oxide pigment and said β-cyclodextrin is urea.

According to an embodiment of the present process, an auxiliary material can be grinded with said metal oxide pigment and said oligomeric and/or polymeric carbohydrate during said step b) of grinding.

In accordance with the process of the present invention, said auxiliary material can be added to and mixed with the aforementioned native metal oxide pigment at any stage of the present process, preferably before or during said step b) of grinding.

More preferably, said auxiliary material can be selected from the group comprising fungicides, stabilizers or fillers, or hydrotropic active additives, for example, urea or other organic or inorganic salts.

According to another aspect, the present inventions also relates to a pigment composite obtainable by the aforementioned process.

As shown in the following experimental part, the pigment composite according to the present invention comprises pigment particles having a submicron granulometry and an outer surface partially or completely covered by said oligomeric and/or polymeric carbohydrate.

In more detail, when dispersed in an aqueous medium, the particles of the present composite have a mean hydrodynamic diameter lower than 1 µm, preferably comprised between 50 nm and 800 nm, more preferably between 100 nm and 500 nm, measured by dynamic light scattering (also known as photon correlation spectroscopy or quasi-elastic light scattering) method, according to the procedure ISO 22412:2017.

According to the present invention, the particle sizes and their distribution are appropriately characterized by the hydrodynamic diameter of the particles measured by photon correlation spectroscopy, also known as dynamic light scattering (DLS) method (Chu, B. Laser light scattering: *Basic Principles and Practice*. Academic Press., 1992; Berne, B. J.; Pecora, R. Dynamic Light Scattering. Courier Dover Publications, 2000). The effective hydrodynamic diameter of the particles is calculated by multimodal analysis of the measured autocorrelation function of scattered light, as taught by Frisken B. e al., *J. Applied Optics*, 2001, 40, 4087-4091.

According to a preferred embodiment, the aforementioned pigment composite can be stably suspended in an aqueous medium, said aqueous medium preferably having a pH comprised between 6 and 12, more preferably between 6 and 9.

More preferably, the pigment composite according to the present invention has a shelf-life comprised between 6 month and 48 months.

As already explained above with reference to the present process and as shown in detail in the experimental part, the present pigment composite is not subjected to particle re-aggregation during milling procedures and is absolutely stable in terms of its color during its shelf-life.

In particular, as it will be shown in detail with reference to the experimental part, such pigment composite can be easily and stably dispersed in liquid media, in particular in an aqueous medium, obtaining suspensions which have good stability and strong coloring hues.

When said step b) of grinding is carried out under dry milling conditions, the pigment composite is in dry form. When said step b) of grinding is carried out under wet milling conditions, the present pigment composite can be in the form of a viscous paste, for example a water-based paste.

Coherently, according to another aspect, the present inventions also relates to the use of the aforementioned pigment composite for the coloration of cosmetic, painting, coating formulations or other applications where smooth and homogeneously-covered and colored surfaces are required.

The use of the aforementioned pigment composite in cosmetics is particularly preferred.

According to a preferred embodiment, the present pigment composite can effectively be used for the preparation of a cosmetic composition, more preferably for the coloration of a cosmetic composition such as a foundation, a primer, a concealer, a lipstick, a lip gloss, a bronzer, an eye shadow, an eye liners, an eyebrow, a mascara, an enamel or any other cosmetic composition comprising a pigment. This embodiment extends to a method for preparing, in particular coloring a cosmetic composition, such as a foundation, a primer, a concealer, a lipstick, a lip gloss, a bronzer, an eye shadow, an eye liners, an eyebrow, a mascara, an enamel or any other cosmetic composition, said method comprising the step of adding, to their respective cosmetic compositions, the pigment composite of the present invention.

Accordingly, with reference to another aspect, the present invention relates to a cosmetic composition comprising the aforementioned pigment composite, said cosmetic composition being preferably a product for facial make-up.

Alternatively, the aforementioned pigment composite can be used as coloring additive in cement, gypsum plaster, soaps, papers, aqueous and non-aqueous printing inks, for example inks for gravure printing, screen printing or printing of paper, rubber lattices or preparations for coloring leather by coating. This embodiment extends to a method of coloring materials such as cement, gypsum plaster, soaps, papers, aqueous and non-aqueous printing inks, comprising the step of adding, to their respective compositions, the pigment composite of the present invention.

The invention is hereinafter described in a non-limiting way by means of the following examples.

EXPERIMENTAL

Example 1: Preparation of a Pigment Composite Under Neutral Conditions

β-cyclodextrin was added to native metal oxide according to a metal oxide/carbohydrate mass ratio equal to 1:2. Red iron oxide supplied by SunChemical Co. was used.

β-cyclodextrin and native metal oxide have been mixed together and milled inside a planetary ball mill (Retsch PM 100) at 500 rpm according to a ball-to-mass ratio equal to 12:1. Milling processing was carried out for 90 minutes.

A fine powder having a red color was obtained.

The procedure was repeated using carboxymethyl cellulose (CMC) instead of β-cyclodextrin (β-CD). The metal oxide/carbohydrate ratio was kept equal to 1:2 and the milling step was carried out under the same conditions.

A fine powder having a red color was obtained.

Then, the procedure both with β-cyclodextrin and carboxymethyl cellulose was repeated for other three different kind of native pigments with equal metal oxide/carbohydrate ratio and under the same milling conditions; the native pigments used were the following: yellow iron oxide; white titanium oxide; green chromium oxide (all metal oxides are supplied by SunChemical Co.).

The total number of experiments under neutral conditions was eight.

Example 2: Preparation of a Pigment Composite Under Slightly Basic Conditions

β-cyclodextrin was added to native metal oxide according to a metal oxide/carbohydrate ratio equal to 1:2. Red iron oxide supplied by SunChemical Co. was used.

β-cyclodextrin and native metal oxide was mixed together and sodium hydrogen carbonate was added to them. The mass ratio between metal oxide, β-cyclodextrin and sodium hydrogen carbonate was 1:2:1, respectively.

The mixture thus obtained was added into a planetary ball mill (Retsch PM 100) and, then, milled at 500 rpm according to a ball-to-mass ratio equal to 12:1. The milling processing was carried out for 90 minutes.

A fine powder having a red color was obtained.

The procedure was repeated for other three different kind of native pigments with equal metal oxide/carbohydrate/NaHCO$_3$ ratio and under the same milling conditions; the native pigments used were the following: yellow iron oxide; white titanium oxide; green chromium oxide.

The total number of experiments under slightly basic conditions was four.

Example 3: Preparation of a Pigment Composite Under Basic Conditions

β-cyclodextrin was added to native metal oxide according to a metal oxide/carbohydrate mass ratio equal to 1:2. Red iron oxide supplied by SunChemical Co. was used.

β-cyclodextrin and native metal oxide was mixed together and sodium hydroxide was added to them. The mass ratio between metal oxide, β-cyclodextrin and sodium hydroxide was 2:4:1, respectively.

The mixture thus obtained was added into a planetary ball mill (Retsch PM 100) and, then, milled at 500 rpm and using a ball-to-mass ratio equal to 12:1. The milling processing was carried out for 90 minutes.

A fine powder having a red color was obtained.

The procedure was repeated for other three different kind of native pigments with metal oxide/carbohydrate/NaOH ratio and under the same milling conditions; native pigments used were the following: yellow iron oxide; white titanium oxide; green chromium oxide.

The total number of experiments under basic conditions was four.

Example 4: Milling of a Native Pigment Under Neutral Conditions (Comparative Example)

The procedure of Example 1 was carried out under the same milling conditions using native red iron oxide only. A milled pigment in form of a red powder was obtained.

The thus obtained powder showed a slightly darker color, if compared to the pigment composite according to the present invention obtained at Example 1.

The aforementioned procedure was carried out for native yellow iron oxide, native white titanium oxide and green chromium oxide, too.

Example 5: Determination of the Hydrodynamic Diameter in Neutral Suspensions

In order to evaluate the particle size and its distribution, pigment composites obtained in Example 1 were appropriately characterized by photon correlation spectroscopy.

1-5 mg of each sample as prepared in Example 1 were suspended in 4 ml distilled water inside transparent plastic cuvettes (90° scattering of 678 nm laser light) and the light scattering was measured in a Brookhaven 90Plus Particle Size Analyzer equipment, according to the procedure ISO 22412:2017.

Samples were freshly shaken and particle sizes were calculated from multimodal intensity distribution model by weighted average of 9 consecutive experiments (data collection period: 30 seconds in each run).

In following Table 1 the distribution of the calculated hydrodynamic diameter (nanometers) of pigment composites in neutral suspensions (pH=between 6 and 7) is shown.

Pigment powders obtained in Example 4 were appropriately characterized by photon correlation spectroscopy, too.

In Table 1 the distribution of the calculated hydrodynamic diameter of milled pigment powders obtained in Example 1 and 4 in neutral suspensions (pH=between 6 and 7) is shown.

TABLE 1

|  | <50 | 50-150 | 150-250 | 250-500 | 500-1000 | >1000 |
|---|---|---|---|---|---|---|
|  |  |  | nm |  |  |  |
| Red iron oxide | — | <1% | 2% | 21% | 21% | 56% |
| Red iron oxide and β-CD | 5% | 14% | 40% | 37% | — | 3% |
| Red iron oxide and CMC | 2% | 17% | 38% | 34% | 10% | — |
| Yellow iron oxide | — | — | — | 19% | 74% | 7% |
| Yellow iron oxide and β-CD | — | — | — | 23% | 51% | 26% |
| Yellow iron oxide and CMC | 1% | 12% | 28% | 55% | 5% | — |
| White titanium oxide | — | 1% | 2% | 6% | 19% | 72% |
| White titanium oxide and β-CD | — | 6% | 3% | 91% | — | 1% |
| White titanium oxide and CMC | <1% | 16% | 38% | 40% | 5% | — |
| Green chromium oxide | — | — | — | — | 11% | 89% |
| Green chromium oxide and β-CD | — | — | — | — | 1% | 99% |
| Green chromium oxide and CMC | <1% | — | — | 48% | 35% | 18% |

As regards red iron oxide particles, it is evident that composites obtained by the process according to the present invention generally have smaller hydrodynamic diameter. The distribution of the hydrodynamic diameter is considerably shifted to 150-200 nm for both red iron oxide milled with β-CD (40% of the total number of pigment particles) and red iron oxide milled with CMC (38% of the total number of pigment particles), if compared with the distribution of the hydrodynamic diameter of milled iron oxide without using any oligomeric and/or polymeric carbohydrate.

Surprising improvements have been also achieved with white titanium oxide and green chromium oxide. If compared with pigments milled under the same conditions but without any additive, white titanium oxide milled with β-CD, white titanium oxide milled with CMC and green chromium oxide milled with CMC respectively show a reduced hydrodynamic diameter.

One can notice that some composites according to the present invention made by milling native pigments with CMC have an even lower diameter with respect to composite obtained by milling the same pigment with β-CD.

Example 6: Determination of the Hydrodynamic Diameter in Slightly Basic Suspensions In order to evaluate the particle size and its distribution, pigment composites obtained in Example 2 were appropriately characterized by photon correlation spectroscopy. 1-5 mg of each sample as prepared in Example 2 were suspended in 4 ml distilled water and subjected to measurements as in Example 5.

Samples were freshly shaken and particle sizes were calculated from multimodal intensity distribution model by weighted average of 9 consecutive experiments.

In following Table 2 the distribution of the calculated hydrodynamic diameter (nanometers) of pigment composites in slightly basic suspensions (pH=between 7.5 and 8.5) is shown.

TABLE 2

|  | <50 | 50-150 | 150-250 | 250-500 | 500-1000 | >1000 |
|---|---|---|---|---|---|---|
|  |  |  | nm |  |  |  |
| Red iron oxide, β-CD and NaHCO$_3$ | 1% | <1% | 64% | 27% | 5% | 3% |
| Yellow iron oxide, β-CD and NaHCO$_3$ | — | 10% | 83% | 6% | — | 1% |
| White titanium oxide, β-CD and NaHCO$_3$ | 20% | 18% | 39% | 20% | 3% | — |
| Green chromium oxide, β-CD and NaHCO$_3$ | <1% | 8% | 10% | 64% | 11% | 7% |

Looking at Table 1 and Table 2 at the same time, it is clear that particles obtained by milling pigments with β-CD, together with NaHCO$_3$, have a hydrodynamic diameter generally smaller than the diameter of particles obtained by milling pigments with β-CD without any inorganic additive and dispersed in neutral environment.

Example 7: Milling of a Native Pigment Under Neutral Conditions (Comparative Example)

The procedure of Example 3 was carried out under the same milling conditions using native red iron oxide and NaOH only without any oligomeric and/or polymeric carbohydrate. A milled pigment in form of a red powder was obtained.

The thus obtained powder showed a slightly darker color, if compared to the pigment composite according to the present invention obtained at Example 3.

The aforementioned procedure was carried out for native yellow iron oxide, native white titanium oxide and green chromium oxide, too.

Example 8: Determination of the Hydrodynamic Diameter in Basic Suspensions

In order to evaluate the particle size and its distribution, pigment composites obtained in Example 3 were appropriately characterized by photon correlation spectroscopy. 1-5 mg of each sample as prepared in Example 3 were suspended in 4 ml distilled water and subjected to measurements as in Example 5.

Samples were freshly shaken and particle sizes were calculated from multimodal intensity distribution model by weighted average of 9 consecutive experiments.

In following Table 3 the distribution of the calculated hydrodynamic diameter of pigment composites in mild basic suspensions (pH=between 10 and 11) is shown.

In order to evaluate the particle size and its distribution, pigment powders obtained as prepared in Example 7 were appropriately characterized by photon correlation spectroscopy, too.

In Table 3 the distribution of the calculated hydrodynamic diameter of pigment milled powders obtained in Example 3 and 7 in mild basic suspensions (pH=between 10 and 11) is shown.

TABLE 3

|  | <50 | 50-150 | 150-250 | 250-500 | 500-1000 | >1000 |
|---|---|---|---|---|---|---|
|  |  |  | nm |  |  |  |
| Red iron oxide and NaOH | — | <1% | — | 1% | 19% | 80% |
| Red iron oxide, β-CD and NaOH | 33% | 25% | 37% | 5% | <1% | — |
| Yellow iron oxide and NaOH | — | 1% | 5% | 11% | 19% | 63% |
| Yellow iron oxide, β-CD and NaOH | 2% | 19% | 52% | 22% | 5% | — |
| White titanium oxide and NaOH | <1% | 14% | 20% | 42% | 18% | 5% |
| White titanium oxide, β-CD and NaOH | — | 19% | 62% | 17% | 3% | — |
| Green chromium oxide and NaOH |  |  | mainly dissolved |  |  |  |
| Green chromium oxide, β-CD and NaOH | 4% | 31% | 54% | 5% | 6% | — |

Looking at Table 1, Table 2 and Table 3 at the same time, it is clear that particles obtained by milling pigments with β-CD, together with NaOH, have a hydrodynamic diameter generally smaller than not only the diameter of particles obtained by milling pigments with β-CD without any inorganic additive and dispersed in neutral environment, but surprisingly also the diameter of particles obtained by milling pigments with β-CD, together with NaHCO$_3$.

In particular, significant improvements with respect to a composite obtained by milling pigments with β-CD and NaHCO$_3$ were achieved by milling red iron oxide or green chromium oxide with β-CD and NaOH (less than 2% of particles having less than 150 nm hydrodynamic diameter for particles obtained by milling red iron oxide, β-CD and NaHCO$_3$ vs. about 58% for particles obtained by milling red iron oxide, β-CD and NaOH).

As a comparison, the particle size of pigment milled by carrying out a process not according to the present invention (Example 7) were measured and are shown in Table 3, too.

As clear from Table 3, particles obtained by milling pigments with β-CD, together with NaOH, have a hydrodynamic diameter generally smaller, when compared with the diameter of the particles obtained by the procedure of Example 7.

Example 9: Preparation of a Pigment Composite Under Basic Conditions with Increased Metal Oxide Content and Determination of Hydrodynamic Diameter β-cyclodextrin was added to native metal oxide according to a metal oxide/carbohydrate mass ratio equal to 2:1.

β-cyclodextrin and native white titanium were mixed together. Before milling, NaHCO$_3$ is added.

The mass ratio between metal oxide, β-cyclodextrin and sodium hydrogen carbonate was 4:2:1, respectively.

The thus obtained mixture was milled inside a planetary ball mill (Retsch PM 100) at 550 rpm and using a ball-to-mass ratio equal to 9:1. Milling processing was carried out for 150 minutes.

The procedure was repeated under the same condition by adding NaOH, instead of NaHCO$_3$.

In order to evaluate the particle size and its distribution, pigment composites thus obtained were appropriately characterized by photon correlation spectroscopy.

1-5 mg of each sample thus prepared were suspended in 4 ml distilled water and subjected to measurements as in Example 5.

Samples were freshly shaken and particle sizes were calculated from multimodal intensity distribution model by weighted average of 9 consecutive experiments.

In following Table 4, the distribution of the calculated hydrodynamic diameter of the thus obtained composites in slightly basic and in mild basic suspensions are respectively shown.

TABLE 4

|  | <50 | 50-150 | 150-250 | 250-500 | 500-1000 | >1000 |
|---|---|---|---|---|---|---|
|  |  |  | nm |  |  |  |
| White titanium oxide, β-CD and NaHCO$_3$, pH = 7-7.5 | 40% | 41% | 11% | 6% | 2% | — |
| Yellow iron oxide, β-CD and NaOH, pH = 9.5-10 | 66% | 26% | 7% | 6% | <1% | <1% |

Surprisingly, by comparing the particle size distributions shown in Table 4 with the particle size distribution of white titanium oxide composite of Table 2 (White titanium oxide, β-CD and NaHCO$_3$) and white titanium oxide of Table 3 (White titanium oxide, β-CD and NaOH), respectively, a remarkable reduction of the hydrodynamic diameter is achieved when the quantity of metal oxide is raised with respect to the quantity of both 13-CD and inorganic additive.

Example 10: Preparation of a Pigment Composite Under Basic Conditions with Reduced Ball-to-Mass Ratio and Determination of Hydrodynamic Diameter Carboxymethyl cellulose was added to native yellow iron oxide according to a metal oxide/carbohydrate mass ratio equal to 1:2.

Carboxymethyl cellulose and native yellow iron oxide were mixed together.

The thus obtained mixture was milled inside a planetary ball mill (Retsch PM 100) at 450 rpm and using a ball-to-mass ratio equal to 3:1. Milling processing was carried out for 180 minutes.

In order to evaluate the particle size and its distribution, the pigment composite thus obtained was appropriately characterized by photon correlation spectroscopy.

1-5 mg of the sample thus prepared were suspended in 4 ml distilled water and subjected to a measurement as in Example 5.

Samples were freshly shaken and particle sizes were calculated from multimodal intensity distribution model by weighted average of 9 consecutive experiments. pH was measured with glass electrode.

In following Table 5 the distribution of the calculated hydrodynamic diameter of the thus obtained composite in neutral suspensions is respectively shown.

TABLE 5

| | <50 | 50-150 | 150-250 | 250-500 | 500-1000 | >1000 |
|---|---|---|---|---|---|---|
| | | | nm | | | |
| Yellow iron oxide and CMC, pH = 6.5-7 | — | <1% | 77% | 22% | <1% | — |

Looking at Table 1 and Table 5 at the same time, it is evident that the composite obtained by milling yellow iron oxide with CMC at a ball-to-mass ratio equal to 10 has particles with a bigger average hydrodynamic diameter if compared with particles of a composite obtained by milling the same pigment with CMC at a ball-to-mass ratio equal to 6.

In particular, the composite obtained by milling yellow iron oxide with CMC at a ball-to-mass ratio equal to 10 have around 41% of particles having a hydrodynamic diameter less than 250 nm, while more than 77% of particles of the yellow iron oxide composite of Table 5 have a hydrodynamic diameter less than 250 nm.

Example 11: Evaluation of Striping Effect in a Skin Cosmetic Liquid Composition for Facial Make-Up Firstly, a gel was prepared at 75° C. from disodium salt of EDTA (0.20 g), carbomer (0.80 g), water (90 ml) and the yellow iron oxide co-milled with CMC (0.80 g), as prepared in Example 1, titanium oxide co-milled with β-CD and NaOH (4.10 g), as prepared in Example 3, red iron oxide co-milled with β-CD and NaOH (0.10 g), as prepared in Example 3.

An emulsion was prepared by the addition to the so-obtained gel of Pemulen TR-1 (0.15 g) and ethylhexyl palmitate (3.00 g) using an industrial mixer. After 60 minutes, the so-obtained emulsion was then cooled. Euxil PE9010 (0.90 g) preservative was added after cooling. The emulsion was finally homogenized.

From the obtained neutral emulsion (pH 6~8) a uniformity test was carried out by the following way: a small drop of the emulsion was put between two glass plates, which were then slid one on the other. Once separated one from the other, the thin emulsion layers remained on one glass plates were analyzed.

As shown in FIG. 1, the cosmetic emulsion obtained by using a mixture of pigment composites according to the present invention is homogeneous and very pleasing to the eye.

Indeed, said pigment composite has been easily and stably dispersed in the an aqueous medium and then a stable emulsion was obtained. The emulsion had a strong coloring hue and was completely deprived from unwanted stripes.

Example 12: Sedimentation Test of the Prepared Solid Pigments

Sedimentation properties of the following pigment composites as obtained in Examples 1-3 were evaluated: red iron oxide milled with CMC when dispersed in water at pH=6-7 (Reference 1); red iron oxide milled with β-CD and NaHCO$_3$ when dispersed in water at pH=7.5-8.5 (Reference 2); red iron oxide milled with β-CD and NaOH when dispersed in water at pH=11 (Reference 3).

Parallelly, sedimentation properties of the following pigment not according to the present invention as obtained in Example 4 were evaluated: milled red iron oxide when dispersed in water at pH=6-7 (Reference 4).

Samples of the aforementioned pigment composite and pigment according to Example 4 were weighed in ~5 mg into a 5 ml glass vial, 4 ml of water were respectively added, then the glass vials were closed and shaken for 30 sec at room temperature in a parallel experiment shaker at 120 rpm.

Figure 2:
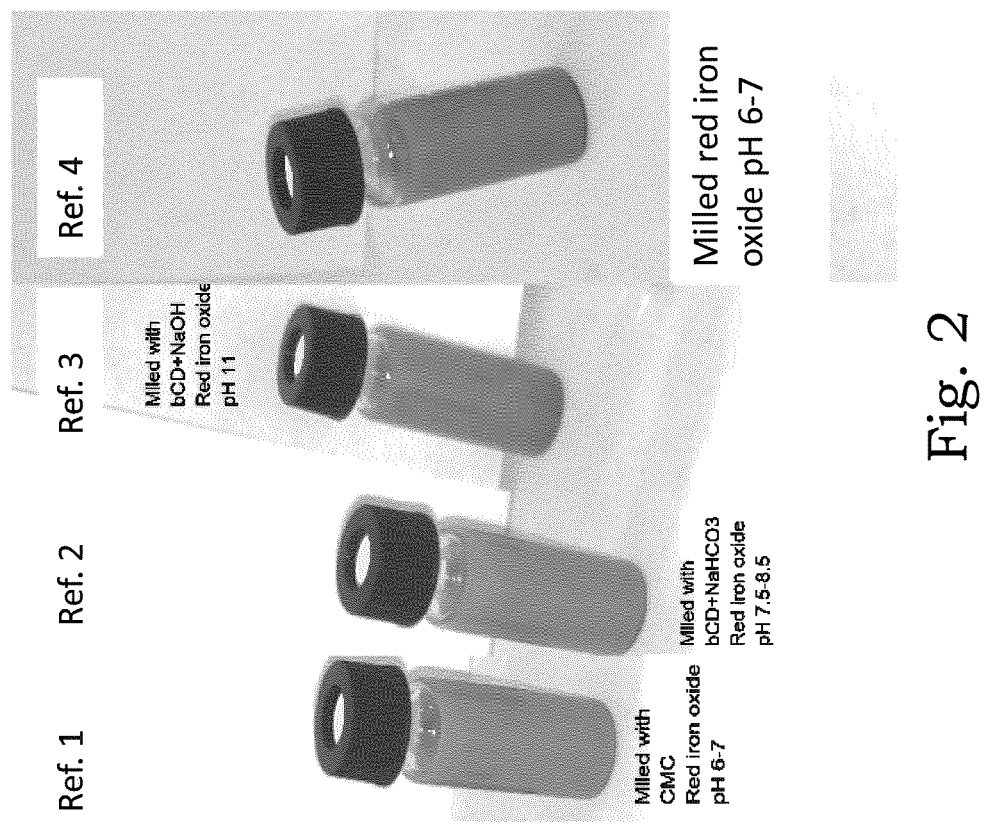
FIG. 2 shows the pigment composites as obtained in following Examples 1-3 dispersed in water.

Photos shown in FIG. 2 were taken after 18 hours, the so-obtained dispersions still standing at room temperature.

Figure 3:
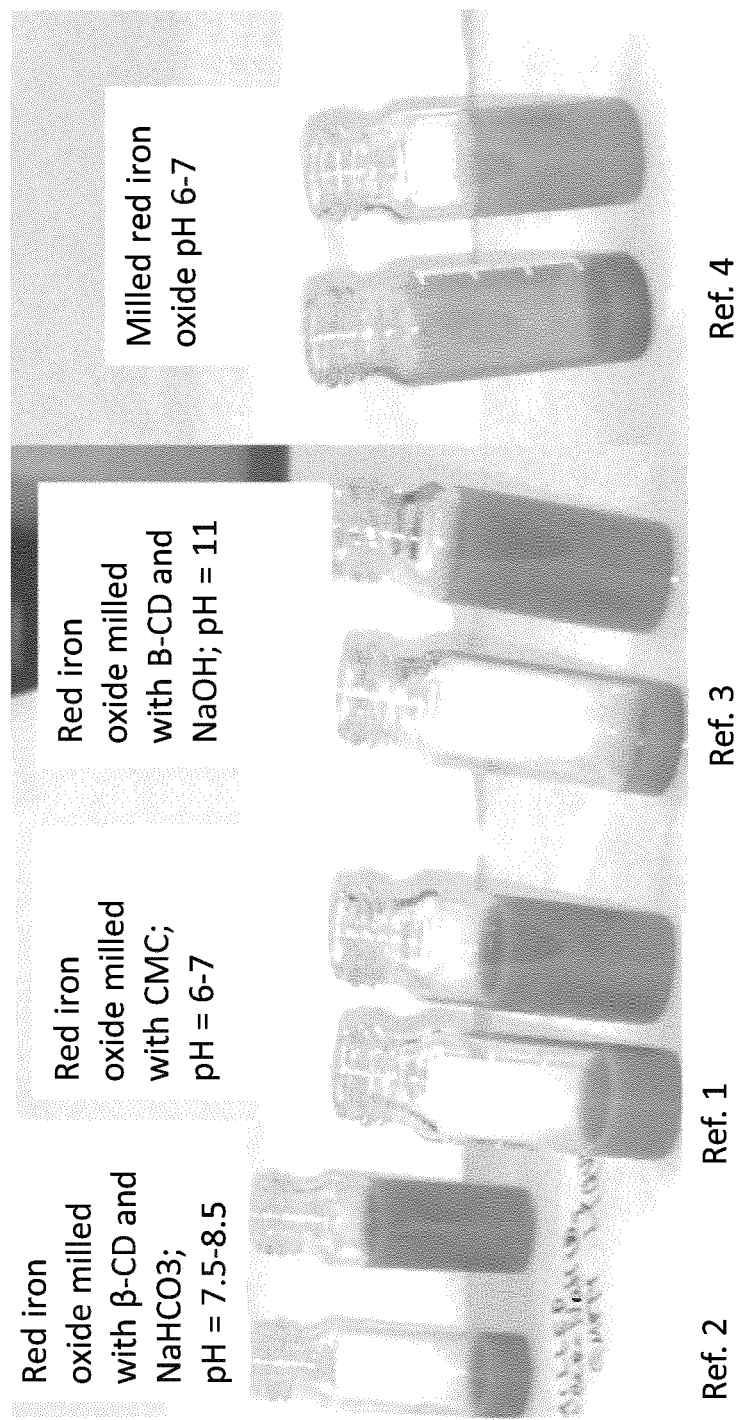
FIG. 3 shows the dispersion shown in FIG. 2 when the supernatant is removed (remaining dispersion: left vials; supernatant: right vials).
Figure 4:
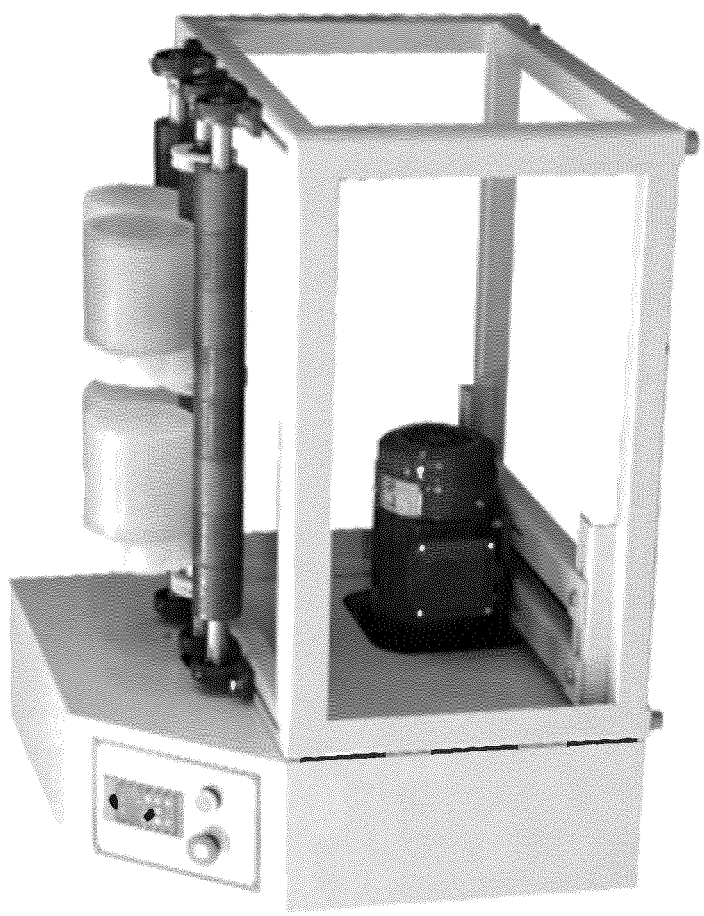
Figure 5:
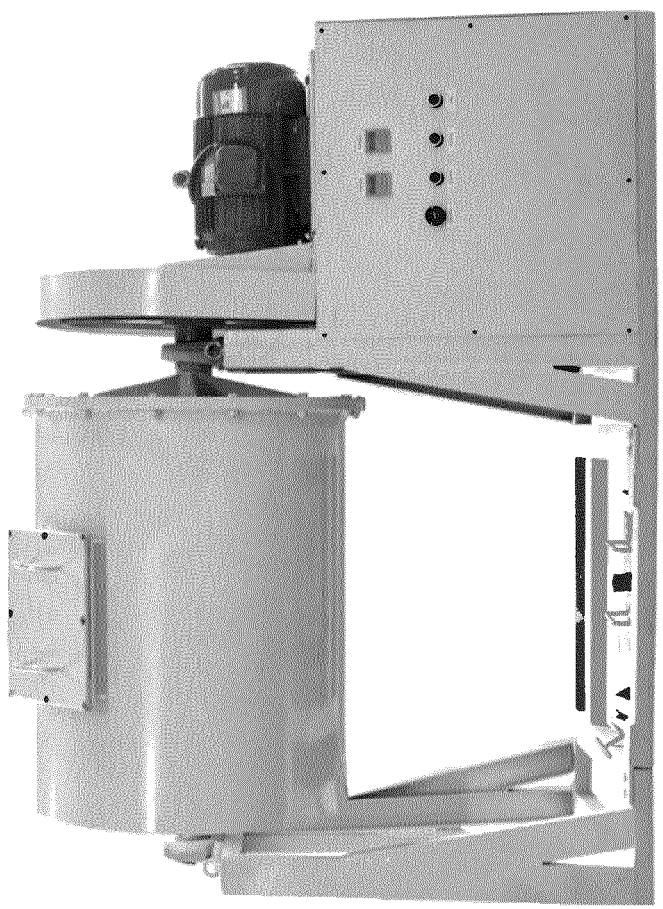

FIG. 3 shows the aforementioned dispersions after that an amount of the liquid was removed from each glass vial (vials on the left) and placed in another vial (vials on the right).

As evident from FIG. 3, the pigment composites according to the present invention did not stick on the walls of the aforementioned glass vials.

Differently, when an amount of the Reference 3 dispersion was removed from its glass vial, it is evident that the pigment not according to the present invention stuck on the glass walls of the container.

Therefore, it is demonstrated that pigment composites according to the present invention do not stick on glass, thus avoiding an effect which is highly unwanted and particularly frowned upon by consumers, especially consumers of cosmetic products.

Example 13: Preparation of a Pigment Composite Under Neutral Conditions in Roll Ball Mill β-cyclodextrin and carboxymethyl cellulose was added to native metal oxide according to a metal oxide/carbohydrate mass ratio equal to 7:3.

Red iron oxide supplied by SunChemical Co. was used. β-cyclodextrin, carboxymethyl cellulose and native metal oxide have been mixed together and milled inside a roll ball mill (Tencan GQM-2-5) in a ceramic jar using zirconia balls at nominal 200 rpm according to a ball-to-mass ratio equal to 4.5:1. Milling processing was carried out for 4 hours.

A fine powder having a red color was obtained.

Then, the procedure both with β-cyclodextrin and carboxymethyl cellulose was repeated for other three different kind of native pigments with equal metal oxide/carbohydrate ratio and under the same Milling conditions; the native pigments used were the following: yellow iron oxide; black iron oxide; white titanium oxide (all metal oxides are supplied by SunChemical Co.).

The total number of experiments under neutral conditions was four.

Example 14: Preparation of a Pigment Composite Under Neutral Conditions in Roll Ball Mill Using Different Milling Materials The procedure of Example 13 with β-cyclodextrin and carboxymethyl cellulose was repeated for four different kind of native pigments with equal metal oxide/carbohydrate ratio and under the same milling conditions; the native pigments used were the following: yellow iron oxide; red iron oxide; black iron oxide; white titanium oxide (all metal oxides are supplied by SunChemical Co.).

The total number of experiments under neutral conditions was four.

Then, the procedure both with β-cyclodextrin and carboxymethyl cellulose was repeated using other four different kind of milling media, namely zirconia balls in zirconia jar, zirconia balls in polymeric perfluorinated jar, and stainless steel balls in stainless steel jar.

The total number of experiments under neutral conditions was 12.

Example 15: Determination of the Hydrodynamic Diameter in Neutral Suspensions

In order to evaluate the particle size and its distribution, pigment composites obtained in Example 13 were appropriately characterized by photon correlation spectroscopy.

1-5 mg of each sample as prepared in Example 13 were suspended in 4 ml distilled water inside transparent plastic cuvettes (90° scattering of 675 nm laser light) and the light scattering was measured in a Brookhaven 90Plus Particle Size Analyzer equipment, according to ISO 22412:2017.

Samples were freshly shaken and particle sizes were calculated from multimodal intensity distribution model by weighted average of 9 consecutive experiments (data collection period: 30 seconds in each run).

In following Table 1 the distribution of the calculated hydrodynamic diameter (nanometers) of pigment composites in neutral suspensions (pH=between 6 and 7) is shown.

In Table 6 the distribution of the calculated hydrodynamic diameter of milled pigment powders obtained in Example 13 under neutral conditions (pH=between 6 and 7) is shown.

TABLE 6

| | <50 | 50-150 | 150-250 | 250-500 nm | 500-1000 | >1000 |
|---|---|---|---|---|---|---|
| Red iron oxide and CD/CMC | — | — | 3% | 9% | 40% | 48% |
| Yellow iron oxide and CD/CMC | — | — | — | 9% | 44% | 46% |
| Black iron oxide and CD/CMC | — | — | — | 7% | 89% | 4% |
| Titanium oxide and CD/CMC | 11% | 33% | 33% | 17% | 4% | 3% |

As regards red iron oxide particles, it is evident that composites obtained by the process according to the present invention generally have different hydrodynamic diameter distribution. The distribution of the hydrodynamic diameter is considerably shifted to lower nm in all cases as compared to the distribution of the hydrodynamic diameter of milled iron oxide without using any oligomeric and/or polymeric carbohydrate. Different milling media showed no essentially different hydrodynamic radius distributions.

The invention claimed is:

1. A process for the preparation of a composite containing submicron sized particles of a metal oxide pigment and natural-based organic compound, comprising:
  a) providing a metal oxide pigment and an oligomeric and/or polymeric carbohydrate; and
  b) grinding said metal oxide pigment and said oligomeric and/or polymeric carbohydrate inside a ball mill under dry milling conditions, to obtain a pigment composite comprising metal oxide particles having a submicron granulometry and an outer surface partially or completely covered by said oligomeric and/or polymeric carbohydrate;

wherein the mass ratio between said metal oxide pigment and said oligomeric and/or polymeric carbohydrate provided during said step a) is between 1:10 and 10:1, and wherein a base additive is added and mixed to said metal oxide pigment before or during said step b) of grinding, said base additive being an inorganic base additive selected from the group consisting of alkali hydroxide, alkali-earth hydroxide, carbonates, hydrogen-carbonates and any combination thereof.

2. The process according to claim 1, wherein said metal oxide pigment is present in a mass ratio to said oligomeric and/or polymeric carbohydrate of between 1:5 and 5:1.

3. The process according to claim 1, where said ball mill is selected from the group consisting of: planetary ball mills, roll ball mills and cylindrical ball mills.

4. The process according to claim 1, wherein said grinding step b) is carried out with a ball-to-mass ratio of between 2:1 and 15:1.

5. The process according to claim 1, wherein said grinding step b) is carried out at a rotational speed of between 200 rpm and 700 rpm.

6. The process according to claim 1, wherein said grinding step b) is carried out for a time of between 0.5 hours and 15 hours.

7. The process according to claim 1, wherein said metal oxide pigment is a transition metal oxide pigment.

8. The process according to claim 1, wherein said oligomeric and/or polymeric carbohydrate is selected from the group consisting of ionic cellulose, nonionic cellulose, derivative of ionic or nonionic cellulose, starch, alginates, hyaluronates, chitosanes, carrageenans, pectins, cyclodextrins and any combination thereof.

9. The process according to claim 8, wherein said oligomeric and/or polymeric carbohydrate is a cyclodextrin.

10. The process according to claim 8, wherein said oligomeric and/or polymeric carbohydrate is ionic cellulose, non-ionic cellulose or a cellulose derivative, or salts thereof.

11. The process according to claim 1, wherein said inorganic base additive is sodium hydroxide, sodium carbonate or sodium hydrogen carbonate.

12. The process according to claim 11, wherein said pigment is present in a mass ratio to said inorganic base additive of between 1:2 and 10:1.

13. The process according to claim 1, wherein the composite comprises an organic base.

14. The process of claim 7, wherein said transition metal oxide pigment is selected from the group consisting of iron (III) oxides, iron (II) and (III) oxide, titanium oxide, chromium (III) oxide, manganese (IV) oxide, zinc oxide, cobalt (II) oxide, zirconium (IV) oxide, and tungsten (VI) oxide and any combination thereof.

15. The process of claim 9, wherein said cyclodextrin is β-cyclodextrin.

16. The process of claim 13, wherein said organic base is selected from the group consisting of amino acids, alkyl or arylalkyl amines, hydroxyalkyl or (hydroxy) arylalkyl amines, hydroxyalkyl or (hydroxy) arylalkyl ureas, hydroxyalkyl or (hydroxy) arylalkyl thioureas and combination thereof.

* * * * *